United States Patent
Natarajan et al.

(10) Patent No.: US 9,143,961 B2
(45) Date of Patent: Sep. 22, 2015

(54) SWITCHING MATRIX AND TEST PLATFORM

(75) Inventors: Venkataraman Natarajan, Bellevue, WA (US); Arun Ananth Bhatji, Bellevue, WA (US); Mathew Samuel, Renton, WA (US); David Ross Jenkinson, Auburn, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 1162 days.

(21) Appl. No.: 12/830,142

(22) Filed: Jul. 2, 2010

(65) Prior Publication Data

US 2012/0003982 A1    Jan. 5, 2012

(51) Int. Cl.
| | |
|---|---|
| H04W 24/00 | (2009.01) |
| H04W 24/06 | (2009.01) |
| H04B 17/00 | (2015.01) |
| H04W 4/00 | (2009.01) |
| H04L 12/28 | (2006.01) |
| H04M 1/24 | (2006.01) |

(52) U.S. Cl.
CPC ................................. H04W 24/06 (2013.01)

(58) Field of Classification Search
CPC ................................................. H04W 24/00
USPC ......... 455/423–424, 67.11, 69, 67.14, 67, 16; 379/1.01, 16, 17; 370/328–338, 401
See application file for complete search history.

(56) References Cited

U.S. PATENT DOCUMENTS

| | | | |
|---|---|---|---|
| 6,272,337 B1 * | 8/2001 | Mount et al. | .................. 455/423 |
| 6,775,239 B1 | 8/2004 | Akita et al. | |
| 6,788,934 B2 | 9/2004 | Keenan et al. | |
| 7,194,260 B1 | 3/2007 | Jabbary et al. | |
| 7,353,019 B2 | 4/2008 | Martin | |
| 7,688,811 B2 | 3/2010 | Kubler et al. | |

(Continued)

FOREIGN PATENT DOCUMENTS

| | | |
|---|---|---|
| EP | 1662827 A1 | 5/2006 |
| EP | 2117267 A1 | 11/2009 |

(Continued)

OTHER PUBLICATIONS

The PCT Search Report and Written Opinion mailed Jan. 2, 2012 for PCT Application No. PCT/US11/42799, 9 pages.

(Continued)

*Primary Examiner* — Muthuswamy Manoharan
(74) *Attorney, Agent, or Firm* — Lee & Hayes, PLLC

(57) ABSTRACT

A switching matrix and testing platform may enable controlled testing of various configurations of radio access networks (RANs) at various signal strengths. The switching matrix and testing platform may enable testing of the radio frequency (RF) signals from RANs or telecommunications devices for new and/or predetermined scenarios, such as using different configurations of the RANs at various signal strengths. During a scenario, various operations may be performed on the telecommunications device in communication with the tested RF signals, such as making voice calls, transmitting and receiving data (messages, videos, music, etc.). A performance of the telecommunications device and/or various telecommunication network elements may be analyzed in comparison to other telecommunications device and/or various telecommunication network elements.

22 Claims, 7 Drawing Sheets

(56) References Cited

U.S. PATENT DOCUMENTS

| | | |
|---|---|---|
| 8,364,090 B2 * | 1/2013 | Ramasamy et al. ....... 455/67.14 |
| 2003/0162539 A1 * | 8/2003 | Fiut et al. ...................... 455/424 |
| 2005/0053008 A1 | 3/2005 | Griesing et al. |
| 2008/0293402 A1 | 11/2008 | Rajan et al. |
| 2010/0007355 A1 | 1/2010 | Olgaard et al. |
| 2010/0197299 A1 * | 8/2010 | Huber et al. ................. 455/425 |
| 2010/0227607 A1 * | 9/2010 | Lorion et al. ................ 455/425 |
| 2011/0124295 A1 * | 5/2011 | Mahjoubi Amine et al. ......................... 455/67.14 |

FOREIGN PATENT DOCUMENTS

| | | |
|---|---|---|
| JP | 2004023755 | 1/2004 |
| JP | 2006101160 | 4/2006 |
| JP | WO2009129526 | 10/2009 |

OTHER PUBLICATIONS

Translated the Japanese Office Action mailed Feb. 24, 2015 for Japanese patent application No. 2013-518757, a counterpart foreign application of U.S. Appl. No. 12/830,142, 6 pages.

* cited by examiner

SWITCHING MATRIX AND TEST PLATFORM

BACKGROUND

The telecommunications industry is a dynamic industry where new products are continually being released and implemented for use by people and businesses in the marketplace. The new products often include customer-based products and/or infrastructure, such as back-end software and hardware to support the customer-based products, which when used together enable people (via computing devices) to communicate and exchange information/data at continually increased speeds, at increased quality levels, and/or at reduced costs.

A release of a new product can be a complicated endeavor when the new product includes new technology. Not only do traditional concerns exist about marketing, inventory, and sales of the new product, but other concerns exist that may include concerns about compatibility, operation, and future costs, among other concerns related to deployment of the new product that includes new technology.

Before a product (e.g., device, system, software, and/or hardware) is implemented in the market and/or made available for consumption, the product often undergoes rigorous testing to ensure that the product is fully functional/operational upon deployment. This testing can be time consuming and expensive, especially when the new product must be tested in a field environment. In some instances, duplication (repeatability) of a test is difficult or impossible when some aspects of a test are subject to uncontrollable variation based on changes of weather, movement of people, or acts of nature and/or the immediate environment.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
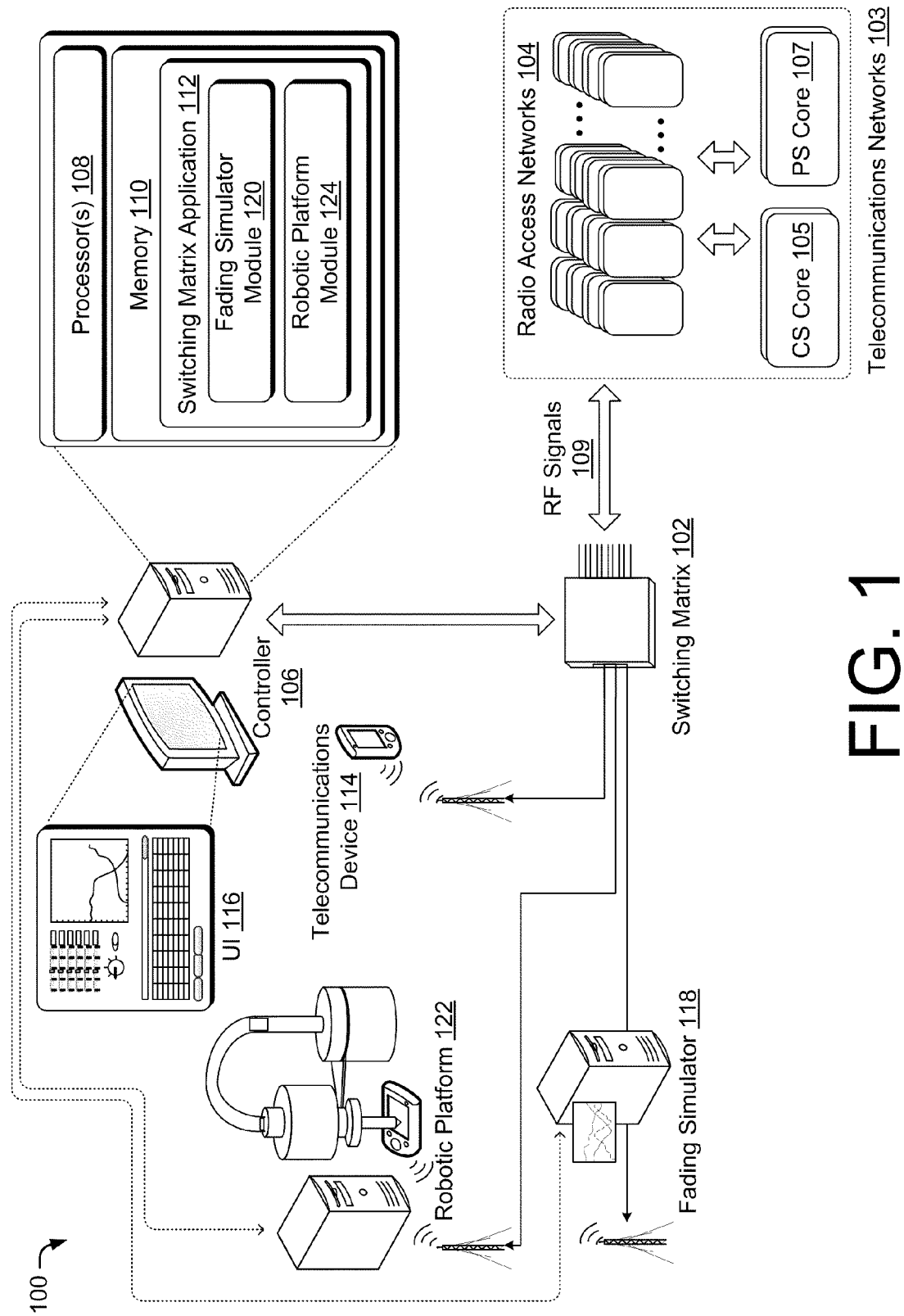
FIG. 1 is an illustrative testing environment that includes a switching matrix to controllably select a network configuration for a test scenario.

Testing of new products may include interoperability testing (IOT), which tests operation, communication, functionality, and other interactions between components of a system that may be built to meet a same set of standards, but may be provided by different companies. In a telecommunications environment, the system may include various configurations of telecommunications networks that include radio access networks (RANs) used for mobile communications. The telecommunications networks may include a number of different types of components, which may be provided by various companies. In some instances, the telecommunications networks may conform to Universal Mobile Telecommunications System (UMTS) technologies that employ UMTS Terrestrial Radio Access Network (UTRAN). In some instances, the UTRAN may share a several components like a Circuit Switch (CS) core network infrastructure and a Packet Switch (PS) core network infrastructure with a GSM EDGE Radio Access Network (GERAN) (Global System for Mobile Communications (GSM), Enhanced Data rates for GSM Evolution (EDGE)). Thus, both UTRAN and GERAN networks (and other possible RANs) may coexist to process telecommunications traffic. In some instances, communications may be handed off between UTRAN and GERAN networks and still maintain a communication with a common core network, such as when a telecommunications device leaves a range of access (zone) of a UTRAN and enters a range of access of a GERAN. Handoffs may also occur between different types of hardware (e.g. different manufacturers, versions, etc.) for a same network type (e.g., UTRAN, GERAN, etc.). In addition, other types of networks, RANs, and/or components (hardware and/or software) may be employed which enable telecommunications devices to communicate with the core network to facilitate activities such as voice calling, messaging, emailing, accessing the Internet, or other types of data communications.

A switching matrix and testing platform disclosed herein enables testing of various telecommunication components including various network components and telecommunications devices by providing a controlled environment to setup predetermined scenarios. As an example, it may be desirable to test interoperability of a telecommunications device with radio frequency (RF) signals from different types of RANs. A testing scenario may be controlled by the switching matrix and control software disclosed herein. The scenario may control the RF signals to initiate, at time=0, a first RF signal at a full signal strength and a second RF signal at a lowest signal strength (possibly no signal) and transition to a signal strength, at time=n, where the first RF signal is at a lower signal strength and the second RF signal is at a higher signal strength relative to respective initial signal strengths for each RF signals. In this scenario, the telecommunications device may transition from communications with the first RF signal to communications the second RF signal at a time=t, where t is a point in time between 0 and n where the transition between the RF signals may occur. During the scenario, various operations may be performed on the telecommunications device, such as making voice calls, transmitting and receiving data (messages, videos, music, etc.). The performance of the telecommunications device may be analyzed in comparison in other RAN configurations and/or on other telecommunications devices (such as other models, other manufacture products, etc.). By running scenarios such as the example scenario described above, RANs and/or telecommunications devices may be tested in a laboratory environment with relatively quick cycle times, making the tests relatively inexpensive, repeatable, and able to simulate configurations which may not be deployed for commercial use (i.e., not implemented in a market for active RAN use).

In some embodiments, additional components may be used to modify signals from the RANs and/or interact with the telecommunications device(s) to simulate realistic environments (e.g., RAN signal reception in a dense urban environment, etc.), repeatability using automation, and so forth. Embodiments of additional components that may be used with the switching matrix are discussed herein.

The switching matrix and testing platform described herein may be implemented in a number of ways. Example implementations are provided below with reference to the following figures.

Illustrative Test Environment

FIG. 1 is an illustrative testing environment 100 that includes a switching matrix to controllably select a network configuration for a test scenario. The environment 100 includes a switching matrix 102 in communication with radio access networks (RANs) 104. In some embodiments, outputs of each of the RANs 104 are connected to the switching matrix 102 to enable the switching box to select individual RF signals 109 of RANs for output through one or more output channels.

Telecommunication networks 103, which generate the RF signals 109 using the RANs 104, operate on one or more of various access technologies and protocols. A non-exhaustive list of example wireless radio access network technologies includes UTRAN, GERAN, Worldwide Interoperability for Microwave Access (WiMax), Long Term Evolution (LTE), and Unlicensed Mobile Access (UMA). Various elements of the telecommunication networks 103 that result in the RF signals 109 may include RANs 104 and core network elements of a circuit switched (CS) core 105 and/or a packet switched (PS) core 107, which may be provided by various different companies, manufacturers, and/or suppliers. For example, two different elements of the RANs 104 may use the same or similar network protocol (e.g., UTRAN, etc.), but may include different hardware and/or software to perform operations to execute a network protocol. In some embodiments, the switch matrix 102 may be used to configure a specific network combination of RF signals from different RANs 104 (e.g., using different software, hardware, or other possible combinations). The switching matrix 102 may be controlled by a controller 106. The controller 106 may be a computing device in communication with the switching matrix 102, via wired or wireless communications, to enable selection and manipulation (e.g., controlling signal strengths, etc.) of the RANs 104. In various embodiments, the controller 106 may include processor(s) 108 and memory 110. The memory 110 may include a switching matrix application 112 that may be used to control the switching matrix 102 and/or outputs of the RANs 104. The switching matrix application 112 may enable a user to perform various functions to control the RANs 104. For example, the switching matrix application 112 may be used to select a portion of the RANs 104, which may in turn output a radio frequency signal using a respective output channel. The radio signal may be received by a telecommunications device 114. The telecommunications device 114 may include mobile telephones (including smartphones), netbooks, tablet computers, personal computers, data sticks, network adapters, and other electronic devices that can exchange signals with the RANs 104.

In some embodiments, the switching matrix application 112 may record a testing scenario during a test of the RF signals 109 generated by RANs 104 or telecommunications device 114. The switching matrix application 112 may then replay a recorded or saved testing scenario to enable repeat testing of similar situations with possibly different elements, such as different selections of software versions on various components of the telecommunications networks 103, including the RANs 104 and/or elements of the CS core 105 and/or the PS core 107, and/or different telecommunications devices 114). For example, the switch matrix application 112 may be used to run a test scenario testing handover of a telecommunication device 114 from a first RF signal to a second RF signal. This test can be repeated after software and/or hardware upgrades to the RANs 104, CS core 105, and/or PS core 107. Thus, the switch matrix application 112 may be used for regression testing of various network elements including the RANs 104 and/or the CS core 105 and/or the PS core 107 network elements and/or the telecommunications device 114. In various embodiments, the switching matrix application 112 may be used to import and then play data (i.e. a test scenario) from a drive test. Drive test data may be data gathered from measurements of signals of deployed RANs 104 in a field environment while moving among the deployed RANs 104, such as in a U.S. city, town, rural area, interstate segment, or other test market or area. The drive test data may be configured (e.g., formatted) to enable replaying a test scenario based on the drive test when the drive test data is used by the switching matrix application 112. Thus, the drive test data may enable replication of RF signals (e.g., the RF signals 109) from the deployed RANs 104 (or other substituted RANs 104) in a lab or testing environment without having to repeat the drive test among the deployed RANs 104.

The switching matrix application 112 may be configured for interaction via a user interface (UI) 116. A user may interact with the UI 116 to select and control the switching matrix 102 via the switching matrix application 112.

In accordance with one or more embodiments, the outputs of the switching matrix 102 may be in modified by one or more processes to enable simulation of signals deployed in a field environment (i.e., replicate live network scenarios) while in a lab or testing environment. For example, a user may desire to test an operation of the telecommunications device 114 when subjected to signals that simulate a dense urban environment where signals reflect off of buildings and other man-made or natural features of the field environment. In these embodiments, the outputs of the switching matrix 102 may be processed by a fading simulator 118 to simulate fading (e.g., multipath, signal deflection, etc.). For example, the fading simulator 118 may receive network information from the switching matrix 102, which may be controlled by the controller 106.

In accordance with various embodiments, the switching matrix application 112 may include a fading simulator module 120 to control the fading simulator 118. The fading simulator module 120 may enable processing of various fading scenarios, which when applied to outputs of the switching matrix 102, may enable a user to test (replicate, simulate) a specific environment that may or may not be deployed in the field (e.g., in an actual city, town, or other area). In some embodiments, the switching matrix application 112 may communicate with another computing device that controls the fading simulator 118, such as to initiate a test.

In some embodiments, the environment 100 may include a robotic platform 122. The robotic platform 122 may operate some or all of the functions of the telecommunications device 114 during a testing scenario. Use of the robotic platform 122 may accommodate repetitive testing to enable direct performance comparisons between subsequent versions of RAN 104 and/or the CS core 105 and/or the PS core 107 network software and hardware upgrades/evolutions (when using a same telecommunications device 114) and/or between different telecommunications devices (when using a same configuration of the RANs 104, etc. to create the RF signals 109). The robotic platform 122 may enable establishing performance benchmarks for the RANs 104 and/or the CS core 105 and/or the PS core 107 network and/or the telecommunications device 114. The robotic platform 122 may detect and record performance of the telecommunications device 114 while the robotic platform 122 controls the telecommunications device 114 during tests which may include voice calls, data exchanges, messaging, emailing, and accessing the Internet, among other possible tasks. In some embodiment, the robotic platform 122 may be implemented as described in patent application Ser. No. 12/239,271 entitled "Robot Device Tester," filed on Sep. 26, 2008, having the same assignee and incorporated herein by reference in its entirety.

The switching matrix application 112 may include a robotic platform module 124 to control some or all functionality of the robotic platform 122. The robotic platform module 124 may initiate testing, run a test protocol to instruct the robotic platform 122 to perform various tasks using the telecommunications device 114, record operation of the telecommunications device 114 for analysis, and perform other various operations via the robotic platform 122. In some embodiments, robotic platform 122 may communicate with the switching matrix application 112 (or vice versa) such as to initiate a test. In various embodiments, the robotic platform 122 may be used in conjunction with the fading simulator 118.

As shown in FIG. 1, the outputs of the switching matrix 102 (i.e. selected RF signals of the available RF signals 109) may be routed to various locations, either via wired routing and/or wireless routing. For example, a selected RF signal may be routed, via a wired connection to an insulated test room, were the signal may then be transmitted wirelessly (e.g., via use of an antenna) to the telecommunications device 114; however, other configurations may be used to enable the telecommunications device to receive the RF signals.

Figure 2:
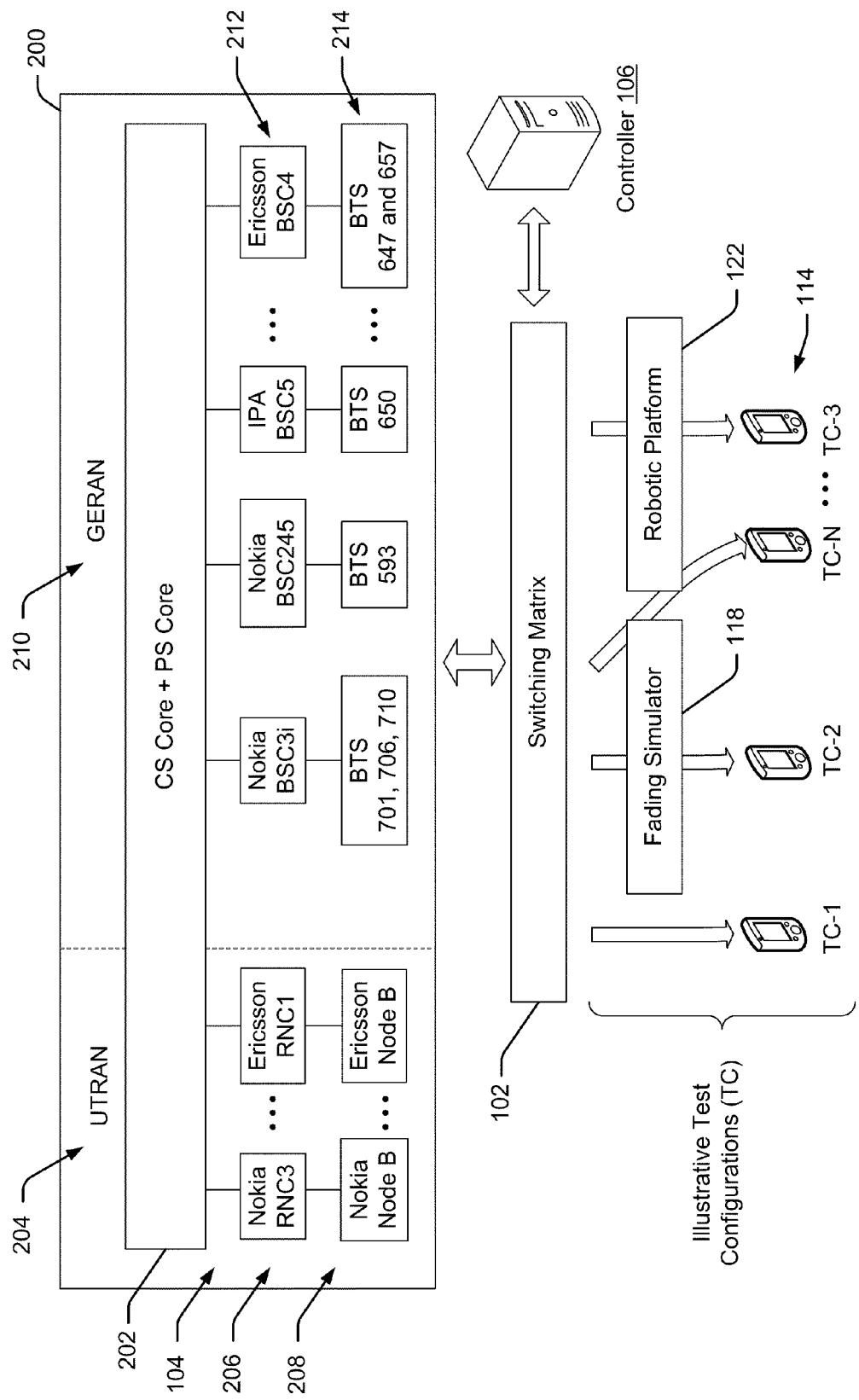
FIG. 2 is a block diagram of an illustrative testing architecture to enable configuration and modification of radio access networks via a switching matrix for testing with a telecommunications device.

FIG. 2 is a block diagram of an illustrative testing architecture 200 to enable configuration and modification of networks via the switching matrix 102 for testing with telecommunications device 114. The architecture 200 shows an illustrative configuration of possible RANs 104 that may be connected to a core network 202, although addition, fewer, or other RANs may be implemented in the architecture 200. The core network 202 may include the CS core 105 and the PS core 107 network components which may support multiple access technologies like Universal Mobile Telecommunications System (UMTS) among other possible network technologies. In some embodiments, the RANs 104 (in addition to corresponding core elements) may include a UTRAN group 204, which may include radio network controllers (RNC) 206 and node B stations 208 to enable communication with the telecommunications device 114 via the RF signals 109. The RANs 104 (in addition to corresponding core elements) may include a GERAN group 210, which may include base station controllers (BSC) 212 and base transceiver stations (BTS) 214 to enable communication with the telecommunications device 114 via the RF signals 109. Although the architecture 200 only shows the UTRAN group 204 and the GERAN group 210, other RF signals may be generated using the architecture 200.

As described above, the RF signals 109 may be in selective communication with the switching matrix 102 to enable selective output of some or all of the RF signals, based in part on instructions from the controller 106.

The telecommunications device 114 may be communication with the RANs 104 via the RF signals from the switching matrix 102 using one or more of the test configurations (TC) shown in FIG. 2. In a first illustrative test configuration TC-1, the telecommunications device 114 may receive raw signals from the RANs 104, as selected by the switching matrix 102. In a second illustrative test configuration TC02, the telecommunications device 114 may receive signals from the switching matrix 102 that have been manipulated by the fading simulator 118. In a third illustrative test configuration TC-3, the telecommunications device 114 may receive raw signals from the RANs 104, as selected by the switching matrix 102, but the telecommunications device 114 may be controlled by the robotic platform 122. In another illustrative test configuration TC-N, the telecommunications device 114 may be controlled by the robotic platform 122 and receive signals from the switching matrix 102 that have been manipulated by the fading simulator 118. Thus, FIG. 2 provides various test configurations that may be implemented to test the telecommunications device 114 or a network configuration, as selected by the switching matrix 102 using the controller 106. In some embodiments, the tests may be repeatable test scenarios that use the drive test data or other recorded (predetermined) test criteria, network settings, etc.

Figure 3:
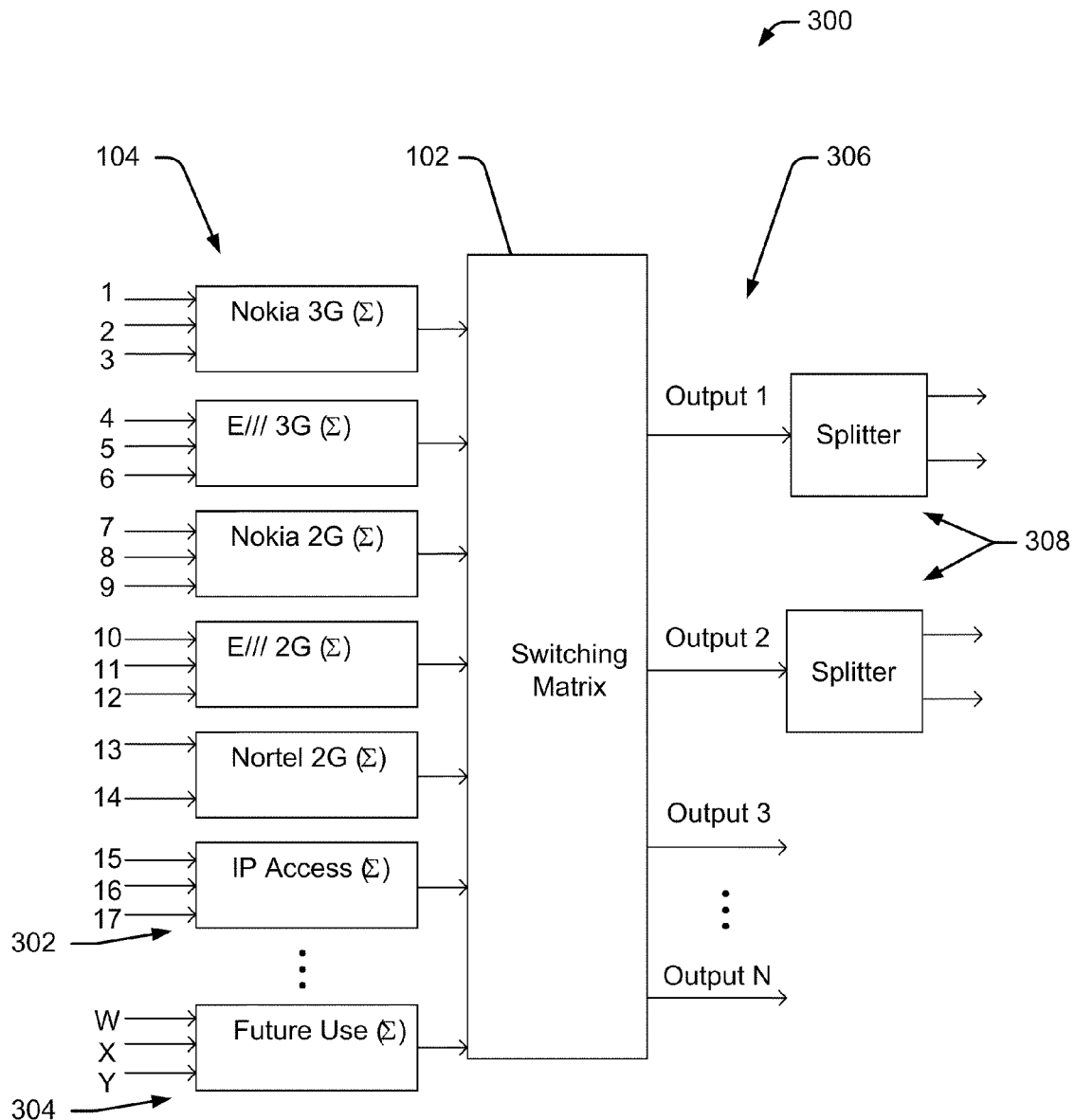
FIG. 3 is a block diagram of an illustrative switching matrix architecture that is in communication with various radio access networks.

FIG. 3 is a block diagram of an illustrative switching matrix architecture 300 that is in communication with various networks. FIG. 3 shows illustrative examples of possible selections of the RANs 104 for input to the switching matrix 102. The RANs 104 may include groupings of various similar types of networks based on factors such as protocol, technology, vendor, supplier, manufacturer, and/or other factors. In some embodiments, a future use group 304 may be available inputs of the switching matrix 102. The future use group 304 may enable integration of future technologies like LTE/WiMax/EDGE evolution or other future (or past technologies).

In accordance with various embodiments, the switching matrix 102 is a box which has RF signal combiners and/or splitters, switches and programmable attenuators to control signal strengths remotely, via the controller 106 of FIG. 1. The switching matrix 102 may have multiple inputs (although 20 inputs are shown, more or fewer may be implemented). The inputs may include, for example, radio frequency inputs such as UMTS Band IV, GSM/EDGE 1900, Wi-Fi signals of different network infra vendors, and so forth.

The switching matrix 102 may have a number of outputs 306 (although four outputs are shown, more or fewer may be implemented). The outputs 306 may be independent and provide a desired combination of test signals, when controlled by the controller 106. The switching matrix 102, under control of the controller 106, may be used to select a variety of network infra combinations based on RAT or vendor. The switching matrix 102 may be implemented to provide isolation between various signal paths. In addition, via the controller 106, the switching matrix 102 may run (playback) and/or record various scenarios including inter-system radio access technology (i-RAT) handovers, hand-in/hand-outs, and so forth. In some embodiments, the switching matrix 102 may provide an isolation of −110 dB or better between various paths. The switching matrix 102 may have a power rating of greater than one watt; however, other power ratings may be used. The switching matrix 102 may be able to vary signal strengths of the RANs 104 by steps of one dB; however, larger or finer incremental steps may be used. Finally, the switching matrix 102 may include an attenuation response time of less than one second; however, other attenuation response times may be used.

In some instances, one of more of the outputs 306 may include one or more splitters 308 to add additional telecommunications devices 114. Example outputs 306 and splitters 308 may include, without limitation, outputs 1 to N. The number of outputs may be designed depending on the number of independent RF signals needed.

Figure 4:
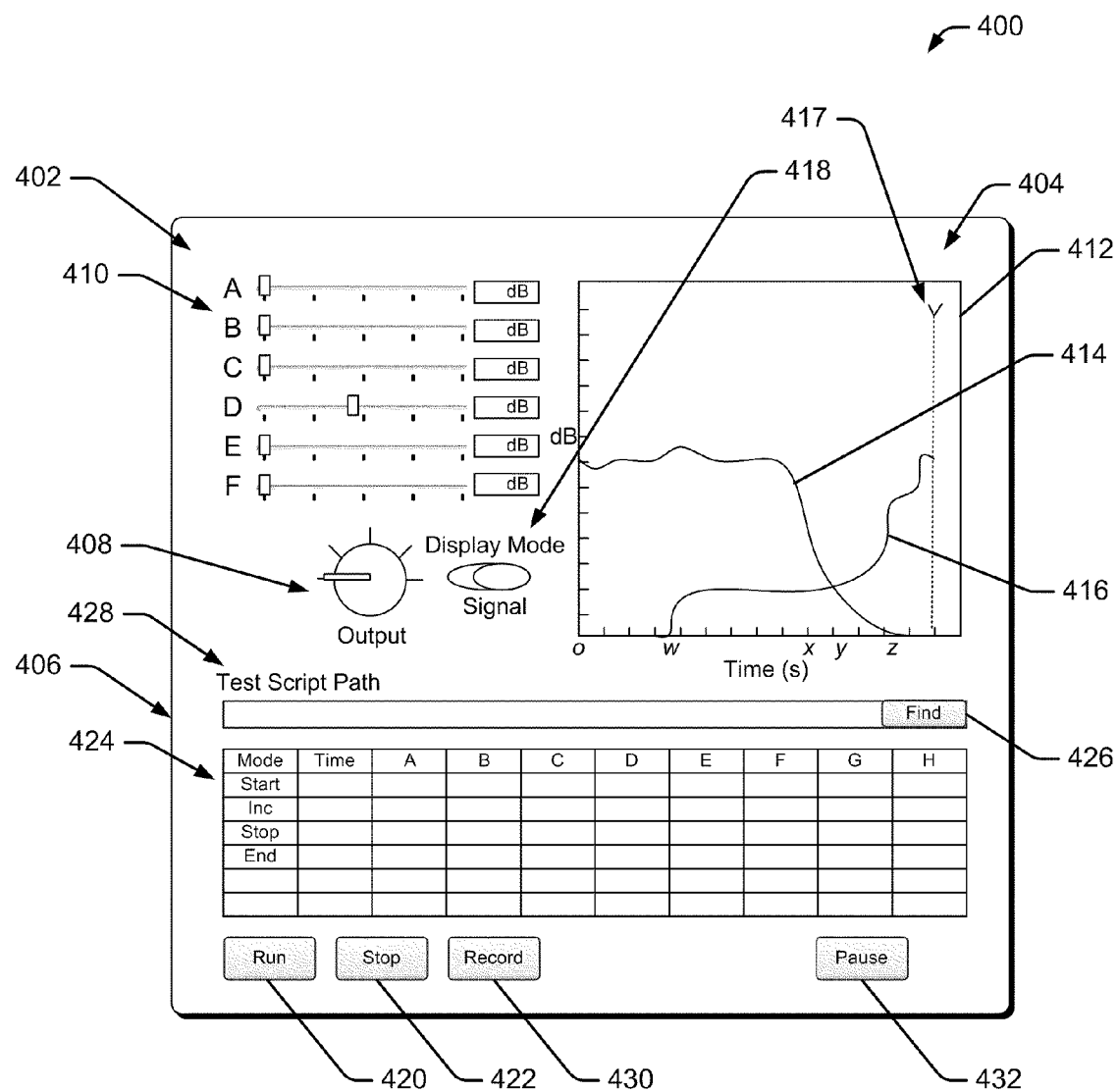
FIG. 4 is an illustrative user interface (UI) to selectively control the switching matrix and outputs of the radio access networks.

FIG. 4 is an illustrative user interface (UI) 400 to selectively control the switching matrix 102 and the outputs of the radio access networks. The UI 400 may be the same or similar to the UI 116 of FIG. 1, and may be accessible via the controller 106. In some embodiments, the UI 400 may include various controls and/or displays to enable selective control of the switching matrix 102. The UI 400 may be arranged with a network control portion 402, a display portion 404, and a script portion 406, among possible portions of the UI. Each portion is discussed in turn.

The network control portion 402 may include network configuration selector 408 to select an input network configuration. For example, a possible network configuration selection may include access to networks (RANs) A-F, as shown in FIG. 4. The RANs may be individually controlled via signal strengths selectors 410 to attenuate or increase a signal strength of a particular RAN of the RANs 104. In various embodiments, the signal strengths selectors 410 may provide an ability to control an attenuation during real-time or near real time for various RANs (channels).

The display portion 404 may include a graphical display 412 that may plot a signal strength (e.g., dB, etc.) and time (e.g., seconds). The graphical display 412 may show data from RANs 104 selected from the network control portion 402. For example, a first curve 414 may represent a first RF Signal (A) and a second curve 416 may represent a second RF signal (D). In an example, the first RF Signal (A) may have a signal strength at a relatively constant level at time=0 to time=x. At time=w, the second RF Signal (D) may be powered on. At time=y, a signal strength of the second network (D) may exceed a signal strength of the first network (A). The signal strength of the first network (A) may be reduced to substantially no signal at time=z.

A current status of the RF signals may be indicated by a marker 417. In some embodiments, the marker 417 may trace over the RF signals, which may be stored as a scenario, to show a point in time of the RF signals generation. Thus, the marker 417 may move along a graphical display of the RF signals which may be predetermined. In various embodiments, the display portion 404 may include a display selector 418 to select a desired display type, which may include without limitation a default display, an attenuation display, inverse display, and so forth.

The UI 400 may simulate movement in a field environment of a telecommunications device 114 moving toward the second network (D), and thus receiving a stronger signal from the second network as the telecommunications device 114 approaches (via increasing signal strength) a transmitter of the second network. The simulation may cause a communication signal used by the telecommunications device 114 to be handed off from the first network (A) to the second network (D) at or near time=y but before time=z. When the signal is not handed off, the telecommunications device 114 may be unable to communicate and exchange data with the network and the call (communication) may be dropped (terminated).

The script portion 406 may include data retrieval, storage, and/or display. In some embodiments, the script portion 406 may include a run command 420 and stop command 422 to execute (start, stop) a script. Running the script by enable playing a testing scenario by controlling the switching matrix 102 to control the output of selected RANs. The script may be currently loaded and visible in a script view 424 or located using a find command 426 and/or a path field 428. The script view 424 may be a comma-separated values (CSV) file with a first column to store a time stamp and remaining columns to store signal strength (e.g., attenuation). In various embodiments, the script portion 406 may include a record command 430 to enable recording a script (or profile), which may be generated by manipulating the networks via the network control portion 402 (e.g., adjusting the signal strengths selectors, etc.). In some embodiments, the UI 400 may also enable pause of a script via a pause command 432.

In some embodiments, the script portion 406 may be used to retrieve stored scripts, such as a drive test, to run (and/or manipulate and then run) using the run command 420. For example, a user may select drive test data from a test market, load the test data via the find command 426 and/or the path field 428, and then modify one or more aspects of the drive test data, such as one or more of the input networks (RANs), (e.g., substituting RANs, etc.). The user may adjust signal strengths settings prior to, during, or after running the scenario based on the drive test data.

In accordance with various embodiments, the UI 400 may accommodate repeatability testing of telecommunication network components and/or telecommunications devices. For example, a new network configuration and/or component (selected by the switching matrix 102) may be run as a scenario using an existing benchmarked telecommunications device 114 to determine whether the new network configuration and/or component is working properly. As another example, a new telecommunications device 114 may be tested in a scenario using a benchmarked network configuration to determine whether the telecommunications device 114 is compatible with the network configuration. Some examples of testing scenarios which may be performed using the UI 400 to control the switching matrix 102 may include interoperability testing (IOT), throughput testing, KPI testing, Tx/Rx Diversity, HSDPA (using multiple telecommunications devices), and so forth.

Illustrative Operation

Figure 5:
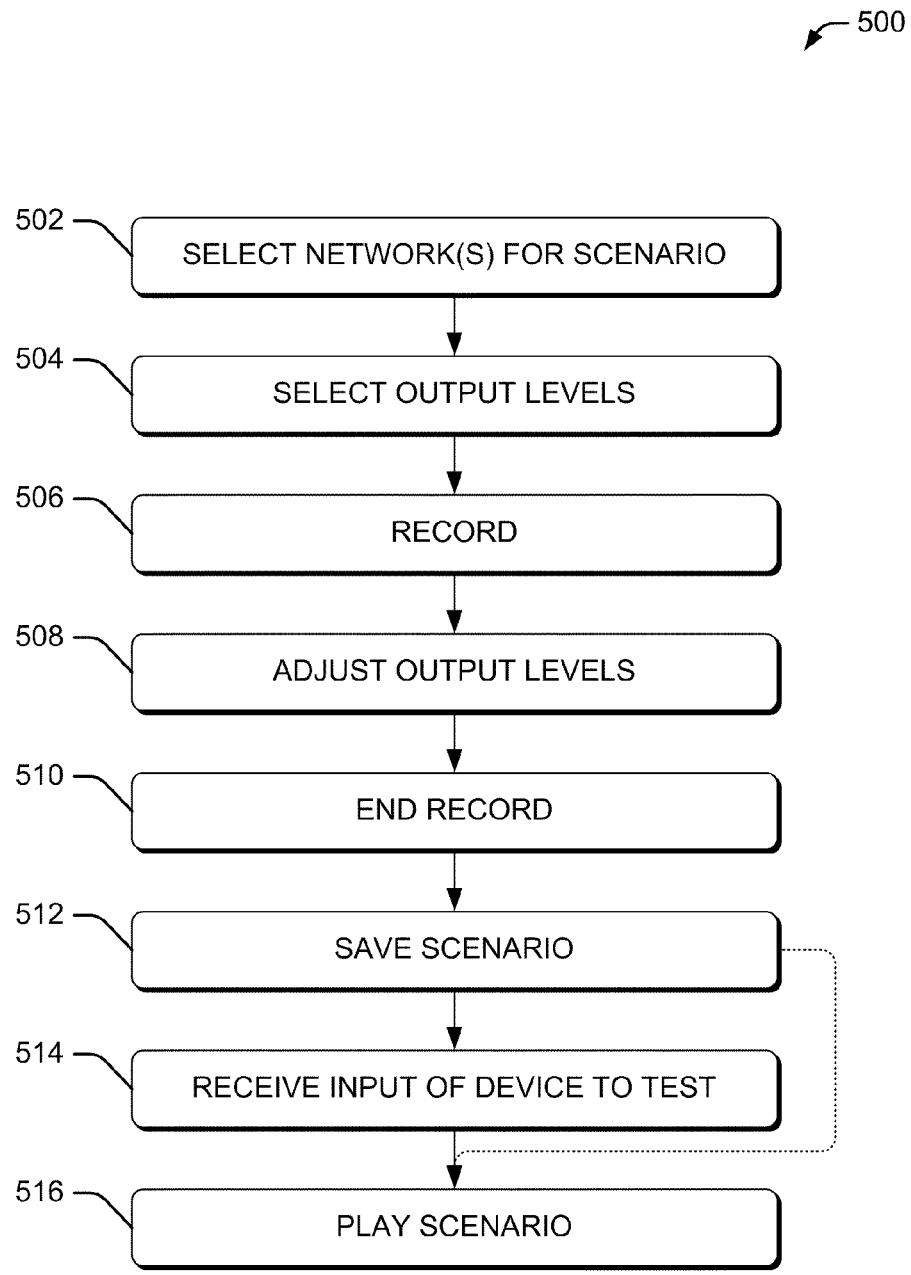
FIG. 5 is a flow diagram of an illustrative process to record a test scenario using the switching matrix.

FIG. 5 is a flow diagram of an illustrative process 500 to record a test scenario using the switching matrix 102. The test scenario may be recorded using the UI 400, which may be processed by the controller 106 via the switching matrix application 112 as described with reference to FIG. 1. As described above, the controller 106, via the switching matrix application 112, controls the switching matrix 102 to selectively control signal strengths of each available RF signal of the RF signals 109.

The process 500 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 500, shall be interpreted accordingly.

At 502, the switching matrix application 112 may control the switching matrix 102 to select one or more of the network configurations(s) (i.e., the RANs 104) for a scenario. For example, a user may interact with the UI 400 to select some of the RANs 104 via the network configuration selector 408.

At 504, the switching matrix application 112 may be used to select signal strengths for the selected RANs at the operation 502. The output levels may be the initial output levels. In some instances, the output levels may be selected by interacting with the UI 400, and more specifically, the signal strengths selectors 410 to attenuate or increase signal strength of a particular RAN.

At 506, the switching matrix application 112 may begin to record a scenario, such as after selection of the record command 430 available via the UI 400. When the recording is initiated at 506, the display portion 404 may begin to plot the variation of RF signal strength in the graphical display 412 over time.

At 508, the switching matrix application 112 may be used to adjust output levels. In some embodiments, the switching matrix application 112 may receive user input (e.g., manual movement of the signal strength selectors 410.) At 510, the switching matrix application 112 may end the recording session initiated at the operation 506. At 512, the switching matrix application 112 may save the scenario for future use, such as for repeatability testing of the telecommunications device 114 and/or a network configuration of the RANs 104.

At 514, the switching matrix application 112 may receive an input (selection) of the telecommunications device 114 involved in the test scenario. The input may be used to log the test, configure the robotic platform for operation with the telecommunications device, and/or perform other device specific operations.

At 516, the switching matrix application 112 may play the saved scenario. The saved scenario may be used for interoperability testing of various RAN configurations, telecommunications devices, and so forth. The above process may be used to create a library of custom scenarios which may be used to test either a network component and/or a configuration and/or telecommunication devices.

Figure 6:
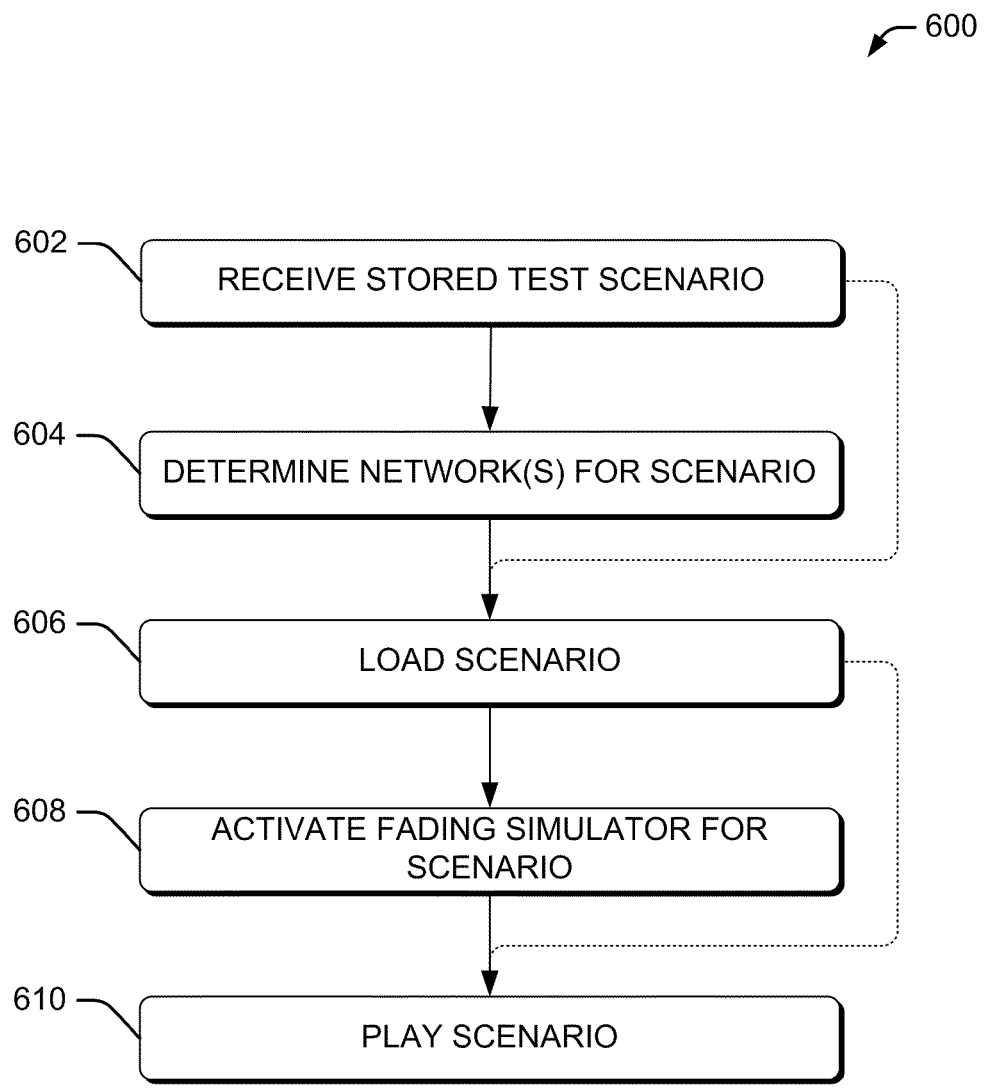
FIG. 6 is a flow diagram of an illustrative process to perform a test using radio access networks selected by the switching matrix and in communication with a telecommunications device.

FIG. 6 is a flow diagram of an illustrative process 600 to perform a test using radio access networks selected by the switching matrix and in communication with a telecommunications device.

At 602, the switching matrix application 112 may retrieve a stored test scenario. For example, a user may navigate or otherwise input a path of a stored test scenario via the find command 426 and/or a path field 428. The stored test scenarios may have been created using the process 500. In some embodiments, the stored test scenario may be based on drive test data.

At 604, the switching matrix application 112 may determine networks for the test scenario, or possibly select different test RANs via the switching matrix 102 for the test scenario. Thus, the test scenario may or may not specify or be limited to a preset configuration of RANs. In some embodiments, the test scenario may only include signal strength settings, which may be applied to any configuration of RANs determined at the operation 604.

At 606, the switching matrix application 112 may load the test scenario. The loaded test scenario may include the determined RANs from the operation 604.

At 608, the switching matrix application 112, via the fading simulator module 120, may optionally activate the fading simulator 118 for the scenario. The fading simulator module 120 may enable the user to select among various fading profiles and/or other options to configure the fading simulator 118 for a test scenario.

At 610, the switching matrix application 112 may play the test scenario to test configurations and operations of some of the RANs 104, which are selectively controlled via the switching matrix 102, and/or test one or more telecommunications devices.

Figure 7:
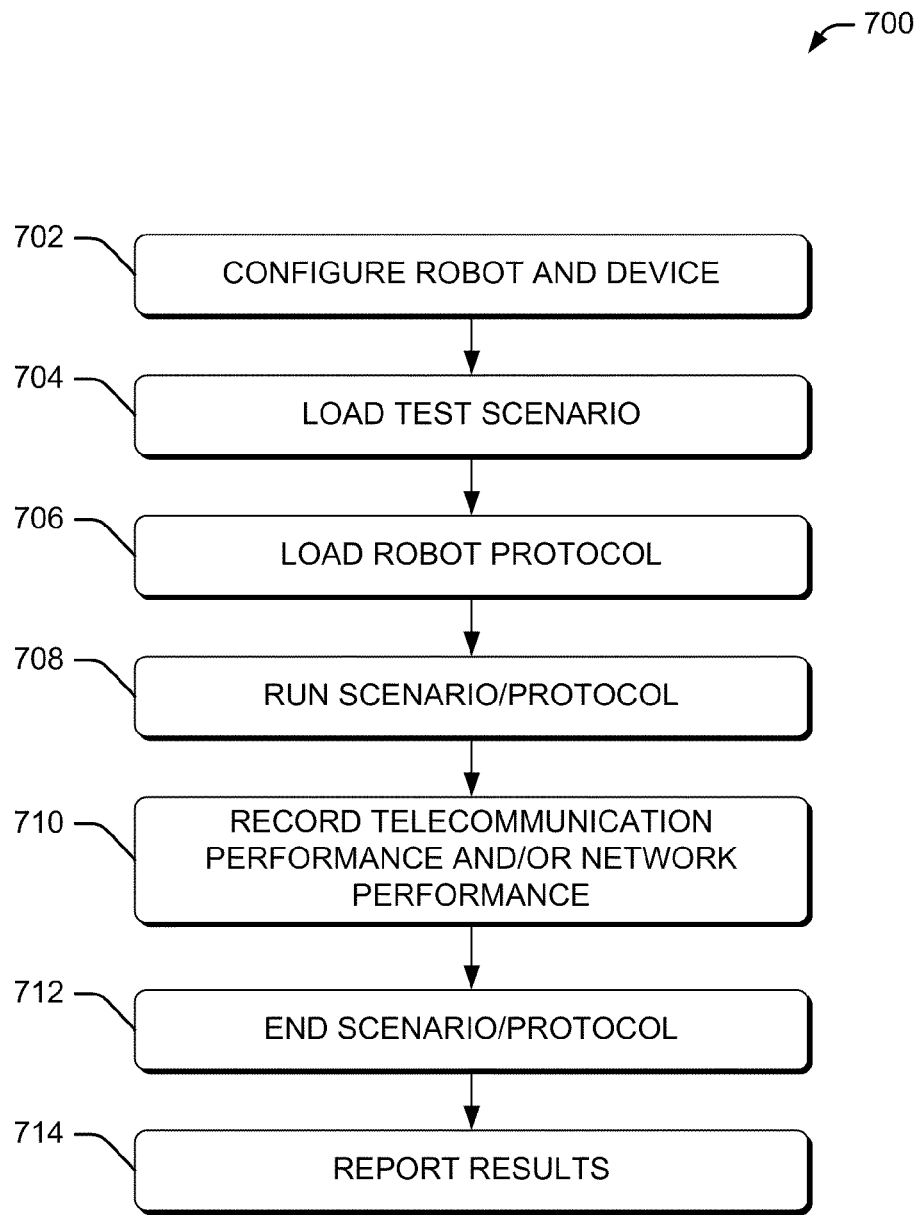
FIG. 7 is a flow diagram of an illustrative process to perform a test using the switching matrix and a robotic platform to execute operations on a telecommunications device during the test.

FIG. 7 is a flow diagram of an illustrative process 700 to perform a test using the switching matrix 102 and a robotic platform to execute operations on a telecommunications device during the test.

At 702, the robotic platform module 124 may configure the robotic platform 122 and the switching matrix application 112 for a test with a telecommunications device, such as the telecommunications device 114. The robotic platform module 124 may store sequences of actions (protocols) which may be performed on a specific telecommunications device, thereby enabling repeatability testing of the operation of the telecommunications device.

At 704, the switching matrix application 112 may load a test scenario. The test scenario may be created via the process 500 and/or may include drive test data.

At 706, the robotic platform module 124 may load a robot protocol to control the telecommunications device during a test scenario performed by the switching matrix application 112 that controls RF Signals via the switching matrix 102. In some embodiments, the loaded robot protocol may perform some or all of the following tests: Different types of calls (CS call, PS call, CS+PS multi-RAB call, etc.), mobility (e.g., I-RAT HO between different infrastructures for CS and multi-RAB call, etc), and/or re-selection between different infrastructures during PS data transfer, and/or other tests to evaluate functionality and/or performance of the RANs 104 and/or the telecommunications device 114.

At 708, the switching matrix application 112 and/or the robotic platform module 124 may run the test scenario and protocol, respectively. In some embodiments, the robotic platform module 124 controls the switching matrix application 112.

At 710, the robotic platform module 124 may record performance and events associated with the telecommunications device and/or various network elements during the test scenario. For example, the robotic platform module 124 may measure response time for a test (e.g., transmitting or receiving data), measure voice calling metrics, record interruptions (dropped calls, unsuccessful data transfers, etc.), or measure and/or record other activities of the telecommunications device (e.g., power consumption, etc.).

At 712, the switching matrix application 112 and/or the robotic platform module 124 may end the test scenario and protocol.

At 714, the switching matrix application 112 and/or the robotic platform module 124 may report results, such as the results of the recorded performance and events associated with the telecommunications device. The reported results may used to test interoperability/performance of the RANs 104 and/or the CS core 105, the PS core 107 network elements, such as hand-ins and hand/outs, etc., and/or the operation of the telecommunications devices in comparison with benchmarked test data. Thus, new telecommunications devices may be tested with network configurations that are known to be stable, reliable, and perform in accordance with specifications, thereby enabling benchmarked testing of new telecommunications devices. Similarly, New or upgraded RAN and core network components and configurations may also be tested using telecommunications devices that are known to be stable, reliable, and perform in accordance with specification, thereby enabling benchmarked testing of various network elements and/or configurations.

The process 700 may be performed by including one or more of the operations from the processes 500 and 600. In some embodiments, the process 700 may include the operation 608 to include the fading simulator in the test scenario. In various embodiments, noise and/or RF interferer sources may be injected into the radio frequency environment to simulate additional live network scenarios.

CONCLUSION

Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method comprising:
    selecting, via a switching matrix, a plurality of radio frequency (RF) signals to be used during a test scenario as selected RF signals from a group of RF signals made available for communication with a telecommunications device in a testing environment;
    recording the test scenario via a switching matrix application that enables real time or near real time control of signal strengths of the selected RF signals under control of the switching matrix;
    loading the test scenario for the selected RF signals by controlling the switching matrix, the test scenario to adjust the signal strengths of the selected RF signals over a period of time to simulate an operation of the telecommunications device in a deployed field environment that is different than the testing environment;
    running the test scenario to control the switching matrix in the testing environment, the test scenario to test at least one of an operation of the telecommunications network elements or the telecommunications devices with the selected RF signals, wherein the test scenario simulates at least hand-ins and hand-outs of communications between the telecommunications device and at least two of the selected RF signals of different types of networks to determine interoperability of the selected RF signals of the different types of networks;
    establishing a performance benchmark for a plurality of telecommunications devices, the performance benchmark based at least in part on repeatability testing implemented using a robotic platform to provide performance comparisons between the telecommunications device and other ones of the plurality of telecommunications devices;
    performing predetermined operations on the telecommunications device during the test scenario using the robotic platform that operates the telecommunications device; and
    reporting performance results of the telecommunications device based at least in part on the performing of the predetermined operations, the reporting including at least a comparison of the performance results with the performance benchmark.

2. The method as recited in claim 1, wherein the loading the test scenario includes loading drive test data obtained by recording deployed network RF signals in the deployed field environment while a recording device moves through the deployed field environment.

3. The method as recited in claim 1, further comprising employing a fading simulator with the switching matrix to modify outputs of the selected RF signals while running the test scenario.

4. The method as recited in claim 3, wherein operation of the fading simulator is synchronized with operation of the robotic platform.

5. The method as recited in claim 1, further comprising recording performance of the telecommunications device via the robotic platform during the predetermined operations.

6. The method as recited in claim 1, further comprising recording and storing performance metrics of at least one of the telecommunications devices or the network element being tested via the robotic platform during the predetermined operations.

7. The method as recited in claim 1, wherein the at least two of the selected RF signals of the different types of networks include RF signals from at least two of:
    a UMTS Terrestrial Radio Access Network (UTRAN),
    a GSM EDGE Radio Access Network (GERAN),
    a Worldwide Interoperability for Microwave Access (WiMax) network,
    a Long Term Evolution (LTE) network, or
    an Unlicensed Mobile Access (UMA) network.

8. A system, comprising:
    a group of radio access networks (RANs) to generate radio frequency (RF) signals;
    a switching matrix to select a plurality of RF signals as outputs that enable communication with a telecommunications device, the plurality of RF signals being selected by the switching matrix from the group of RF signals that are inputs to the switching matrix, the switching matrix to control signal strength of the selected RF signals to perform a test deploying a custom scenario using the telecommunications device;
    a robotic platform to operate the telecommunications device during the custom scenario, wherein the robotic platform implements repeatability testing of a plurality of telecommunications devices to create a performance benchmark to provide performance comparisons between the telecommunications device and other ones of the plurality of telecommunications devices; and
    a controller to run a switching matrix application configured to at least select, load and play the custom scenario by controlling the outputs of the switching matrix, wherein the custom scenario simulates at least hand-ins and hand-outs of communications between the telecommunications device and at least two of the selected RF signals of different types of RANs.

9. The system as recited in claim 8, wherein the switching matrix application is configured to control signals strengths of the plurality of RF signals selected in the network configuration by controlling the outputs of the switching matrix.

10. The system as recited in claim 8, wherein the controller includes the switching matrix application configured to record and save a new test scenario in real-time or in near real-time.

11. The system as recited in claim 8, wherein the custom scenario is at least based in part on drive test data obtained by recording deployed network RF signals in the deployed field environment while a recording device moves through the deployed field environment that is readable by the switching matrix application to control the switching matrix to simulate a deployed field environment of RF signals using the drive test data.

12. The system as recited in claim 8, further comprising a fading simulator to modify the outputs of the selected RF signals.

13. The system as recited in claim 8, wherein the robotic platform provides repeatability testing of the custom scenario.

14. One or more non-transitory computer-readable media storing computer-executable instructions that, when executed on one or more processors, cause the processors to perform acts comprising:
  receiving a selection of radio frequency (RF) signals from a plurality of telecommunications networks accessible by a switching matrix;
  outputting, via the switching matrix, the selected RF signals that are selected to enable communication with a telecommunications device;
  adjusting the selected RF signals based at least in part on a predetermined scenario to control signal strength of the selected RF signals;
  determining a performance benchmark for a plurality of telecommunications devices, the performance benchmark based at least in part on repeatability testing implemented using a robotic platform to provide performance comparisons between the telecommunications device and other ones of the plurality of telecommunications devices; and
  controlling the robotic platform to control operation of the telecommunications device during the adjusting the selected RF signals based at least in part on the predetermined scenario, wherein the predetermined scenario simulates at least hand-ins and hand-outs of communications between the telecommunications device and at least two of the selected RF signals of different types of networks.

15. The one or more non-transitory computer-readable media as recited in claim 14, wherein the adjusting of selected RF signals is performed in real-time or in near real-time.

16. The one or more non-transitory computer-readable media as recited in claim 14, wherein the adjusting the selected RF signals is based on the predetermined scenario that includes predetermined signal strengths that vary over a period of time.

17. The one or more non-transitory computer-readable media as recited in claim 14, wherein the acts further comprise using a fading simulator module to control a fader to simulate fading of at least one of the selected RF signals.

18. The one or more non-transitory computer-readable media as recited in claim 14, wherein the acts further comprise using the robotic platform to test operation of the telecommunication network elements by manipulation of the selected RF signals via the switching matrix.

19. The one or more non-transitory computer-readable media as recited in claim 18, wherein the robotic platform module also controls a fading simulator module to test the telecommunication device under fading conditions.

20. The one or more non-transitory computer-readable media as recited in claim 18, wherein the robotic platform module is used to collect and store statistics documenting at least one of the performance of telecommunication device, network configuration, or network element under test.

21. The one or more non-transitory computer-readable media as recited in claim 14, wherein the acts further comprise:
  recording results of the predetermined scenario.

22. The one or more non-transitory computer-readable media as recited in claim 14, wherein the at least two of the selected RF signals of the different types of networks include RF signals from at least two of:
  a UMTS Terrestrial Radio Access Network (UTRAN),
  a GSM EDGE Radio Access Network (GERAN),
  a Worldwide Interoperability for Microwave Access (WiMax) network,
  a Long Term Evolution (LTE) network, or
  an Unlicensed Mobile Access (UMA) network.

* * * * *